United States Patent
Penn

(10) Patent No.: US 6,181,401 B1
(45) Date of Patent: Jan. 30, 2001

(54) LIQUID CRYSTAL DISPLAY WITH REDUCED OFF STATE LUMINANCE

(75) Inventor: Cecil E. Penn, Scottsdale, AR (US)

(73) Assignee: Honeywell International Inc., Morristown, NJ (US)

(*) Notice: Under 35 U.S.C. 154(b), the term of this patent shall be extended for 0 days.

(21) Appl. No.: 09/130,693

(22) Filed: Aug. 7, 1998

(51) Int. Cl.[7] .................... G02F 1/1335; G02F 1/1337
(52) U.S. Cl. .................... 349/129; 349/106; 349/99
(58) Field of Search .................... 349/106, 129, 349/99

(56) References Cited

U.S. PATENT DOCUMENTS

| | | | |
|---|---|---|---|
| 5,150,235 | * 9/1992 | Haim et al. | 349/73 |
| 5,448,386 | 9/1995 | Watanabe et al. | 349/99 |
| 5,479,282 | * 12/1995 | Toko et al. | 349/129 |
| 5,576,862 | 11/1996 | Sugiyama et al. | 349/129 |
| 5,654,780 | * 8/1997 | Hasegawa et al. | 349/136 |
| 5,717,474 | * 2/1998 | Sarma | 349/85 |
| 5,745,206 | * 4/1998 | Koike et al. | 349/129 |
| 5,793,459 | * 8/1998 | Toko | 349/128 |
| 5,818,615 | * 10/1998 | Abileah et al. | 349/73 |

FOREIGN PATENT DOCUMENTS 2 293 260  3/1996 (GB).
4-37719  * 2/1992 (JP) .................... 349/129

* cited by examiner

Primary Examiner—William L. Sikes
Assistant Examiner—Toan Ton

(57) ABSTRACT

A liquid crystal color display has the range of polarization twist angles between the color filter and the active matrix alignment layers for the cells of at least one primary color different from that of the other primary color cells. Each polarization twist minimizes the off state illumination of the display in a color filter cell so that a normally black display is obtained. In a second embodiment, liquid crystal molecules of the display are tilted relative an alignment layer and at least one primary color filter cell has a tilt different from the tilt in the other primary color filter cells. The molecular tilt minimizes off state illumination in the color filter cells in a manner that provides a normally black display. Molecular tilt and multi-twist may be combined to achieve a normally black display, as may multi-twist or multi-tilt, or a combination thereof, be combined with mono-gap or multi-gap liquid crystal display construction to achieve a normally black display.

27 Claims, 19 Drawing Sheets

LIQUID CRYSTAL DISPLAY WITH REDUCED OFF STATE LUMINANCE

BACKGROUND OF THE INVENTION

1. Field of the Invention

The invention pertains to the field of color displays and more particularly to active and passive matrix liquid crystal displays.

2. Description of the Prior Art

Backlighted liquid crystal displays (LCD) with, for example, dimmable fluorescent backlight and twisted-nematic (TN) liquid crystals, have been developed to provide flat panel displays for applications such as aircraft instrumentation, laptop and notebook computers, and the like. Such LCD's typically use liquid crystal material sandwiched between a back electrode, constructed as a matrix of transparent metal pixels or dot electrodes, and a front electrode made of a continuous transparent metal. The front electrode is often denoted as the common or counter electrode. Each pixel electrode is activated through a switch, usually implemented as a thin film transistor (TFT), which is deposited as a field effect transistor (FET). The drain electrode of each TFT is connected to, or actually forms, the pixel electrode with which it is associated. The gate electrodes of the TFTs in each row of the matrix are commonly connected to a gate bus-line for the row. The source electrodes of the TFTs in each column of the matrix are commonly connected to a source bus-line for the column. An image is created in raster fashion by sequentially scanning the gate bus rows while applying information signals to the source bus columns.

Such an arrangement may provide a monochrome display. Color capability for the LCD is established by positioning color filters at the front surface of respective pixels and grouping the pixels into color groups such as triads, quads, and the like, in, for example, diagonal or delta element arrays. For example, triads with primary color RED, GREEN and BLUE filters are often used. Various colors are generated at a pixel by appropriate video control of the gate and source electrodes of TFTs positioned at each filter cell. Video levels at the gate and source electrodes determine the polarization twist of the light as it traverses the liquid crystal associated with a primary color, thereby determining the intensity of the primary color light at each pixel that is transmitted through the polarizers. Such light intensity control of the primary colors generates the various colors of the display. Color liquid crystal displays, are usually manufactured with a uniform cell gap across the display active area and uniform twist angles across the liquid crystal for all color dots. Because of the properties of TN color mono-gap LCDs, a different level of off-state luminance occurs for each of the color dots. This phenomenon results in undesirably high levels of background luminance. The condition is exacerbated when the display is viewed from varying angles since each color dot changes luminance with viewing angle at different rates, some increasing and some decreasing. This aspect of mono-gap LCD technology results in high level of background luminance with viewing angle, producing undesirable secondary effects in viewability of display symbology. Additionally, objectionably different chromaticities of background color for various angles of view result.

Specifically, a RED, GREEN, BLUE (RGB) multicolor display requires an illumination source having strong spectral emissions at 435 nm, 545 nm, and 610 nm. It is impossible to obtain minimum background (off) transmission for all three wavelengths utilizing a display configured with a single cell gap with uniform twist angles. In such a mono-gap display, emissions from at least two of the three wavelengths leak through the display background resulting in increased background luminance. This, in turn, results in reduced contrast and a chromatic background.

It is desirable for a TN liquid crystal display (LCD) to exhibit a black background in the off state. As stated above, mono-gap LCDs with uniform twist angles exhibit undesirable high off state luminance, caused by light leakage through the liquid crystals. This leakage is primarily due to the wavelength dependence of the transmissions through the liquid crystals. A reduction in off state luminance is achieved with multi-gap construction, wherein the cell gap varies with the filter color. This type of construction, however, establishes three cell gaps, one for each color, the gaps being chosen for minimum transmission for the color transmitted through the cell. Though off state luminance is reduced by the multi-gap construction, the cell gap width must be carefully controlled if the performance gains are to be realized. The tight tolerances that must be maintained for the cell gaps significantly increase the cost of manufacture.

SUMMARY OF THE INVENTION

In accordance with the principles of the present invention, a normally black liquid crystal display is achieved in the off state, with enhanced off angle viewing, in a mono-gap liquid crystal display by providing different polarization twists across the liquid crystal for each of the primary colors employed in the display. This may be achieved with a plurality of rubbing combinations at the alignment layers.

In one preferred embodiment, the alignment layer at the active matrix side of the liquid crystal is rubbed in a direction that is parallel or perpendicular to the polarization of the rear polarizer over its entire length, while the color filter alignment layer adjacent to the front polarizer is rubbed in a different direction for each color filter cell to establish polarization twist angles across the liquid crystal that differ for each color. These twist angles are chosen to minimize the off state transmission of the respective colors. The rubbing directions of the color filters alignment layer are selected to be as close to the polarization of the front polarizer as possible and still be consistent with the minimum off state transmission.

In a second preferred embodiment, the alignment layer of the color filters is uniformly rubbed in a direction that is either parallel or perpendicular to the polarization of the front polarizer, while the alignment layer elements of the active matrix, respectively corresponding to the color filters, are each rubbed in a different direction to establish the desired polarization twists for minimum off-state light transmission.

In a third embodiment of the invention, the alignment layers of the color filters and the active matrix are rubbed in directions that are different for each filter segment. The rubbing directions of the alignment layers of color filter and its corresponding active matrix alignment layer are selected to provide a polarization twist across the liquid crystal that minimizes light transmission when the active matrix is in the off state.

In a fourth embodiment of the invention a combination of multi-gap and multi-twist is employed to achieve a normally black off state. In this embodiment, the alignment layer at one color filter is rubbed in a different direction from that of the other two color filters and the cell gap for one color filter is different from that of the other two color filters.

In still another embodiment of the invention, the color filters and active matrix alignment layers are rubbed in a manner to establish varying molecular tilts of the liquid crystal at the polarizer interface of the respective color transmission paths. These molecular tilts may be all on the active matrix-rear polarizer interface, all on the color filter-front polarizer interface, or may be split between the color filter and active matrix interfaces. It should understood, that the rubbing of the color filter and active matrix alignment layers must provide for a substantially 90° polarization twist across the liquid crystal. With this constraint the rubbing directions can be parallel to the front polarizer and perpendicular to the rear polarizer, perpendicular to the front polarizer and parallel to the rear polarizer, perpendicular to the front and rear polarizers, or parallel to the front and rear polarizers.

In further embodiments of the invention, combinations of polarization twist and molecular tilt may be established to minimize light leakage through the liquid crystal for the primary colors to provide a normally black off state display.

The advantages and novel features of the invention will become apparent from the following detailed description of the invention when considered in conjunction with the accompanying drawings.

DESCRIPTION OF THE PREFERRED EMBODIMENTS

Figure 1A:
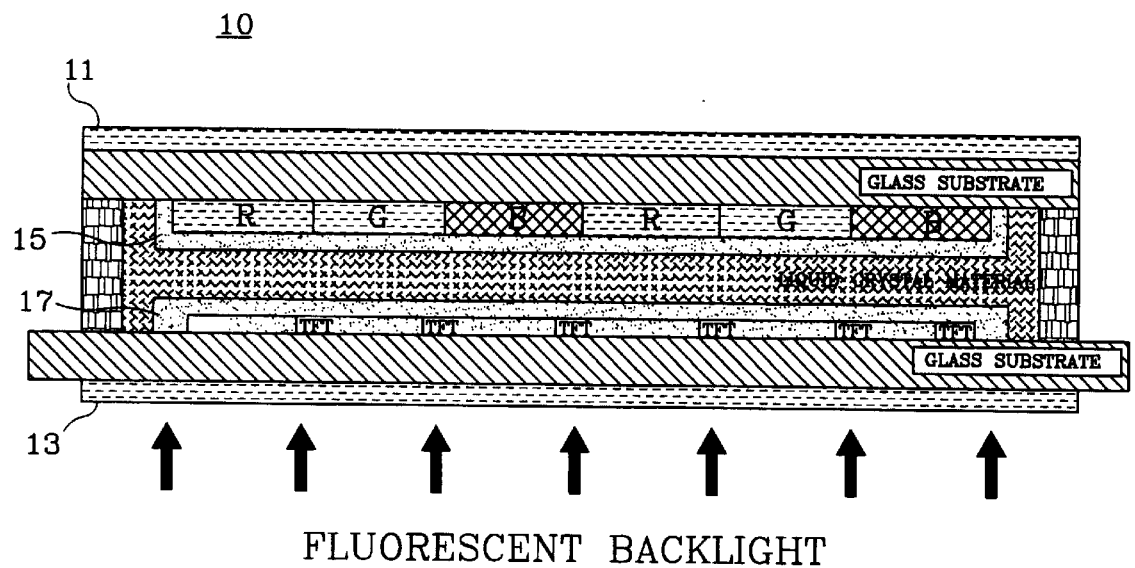
FIG. 1A is a schematic sketch of a Twisted Nematic Active Matrix Color Liquid Crystal Display for which the primary color cell gaps are of equal length (mono-gap) and the off state primary color polarization twist angles are equal (mono-twist).

A prior art mono-gap color liquid crystal display 10 with uniform off state twist angles is shown schematically in FIG. 1A. In this prior art device the front polarizer 11 and the rear polarizer 13 may have polarizations that are parallel or perpendicular, which may be oriented at −45° relative to the horizontal axes when the polarizations are parallel or −45° at the rear polarizer and +45° at the front polarizer when the polarizations are perpendicular. The color filter cells on the color filter alignment layer 15 are all rubbed in the same direction, the direction being parallel or perpendicular to the polarization direction of the front polarizer. Similarly, the cells on the active matrix respectively corresponding to the color filter cells are all rubbed in the same direction, the direction being either parallel or perpendicular to the polarization of the rear polarizer. Light transmitted through a polarized element is at a minimum when the light is polarized perpendicular to the polarization axis of the element. Consequently, to realize minimum light transmission in the off state from the front polarizer, the light must be incident to the front polarizer with a polarization orientation that is perpendicular to the polarization of the front polarizer. Thus, the rubbing directions on the alignment layers 15, 17 must provide for a polarization twist of 90° for minimum light emission from the front polarizer 11 for a display in the off state, when the polarizations of the front 11 and rear 13 polarizers have parallel polarizations. Conversely, the rubbing directions on the alignment layers must provide for a polarization twist of 90° for maximum light emission from the front polarizer 11 when the front 11 and rear 13 polarizers have polarizations that are perpendicular.

Figure 2A:
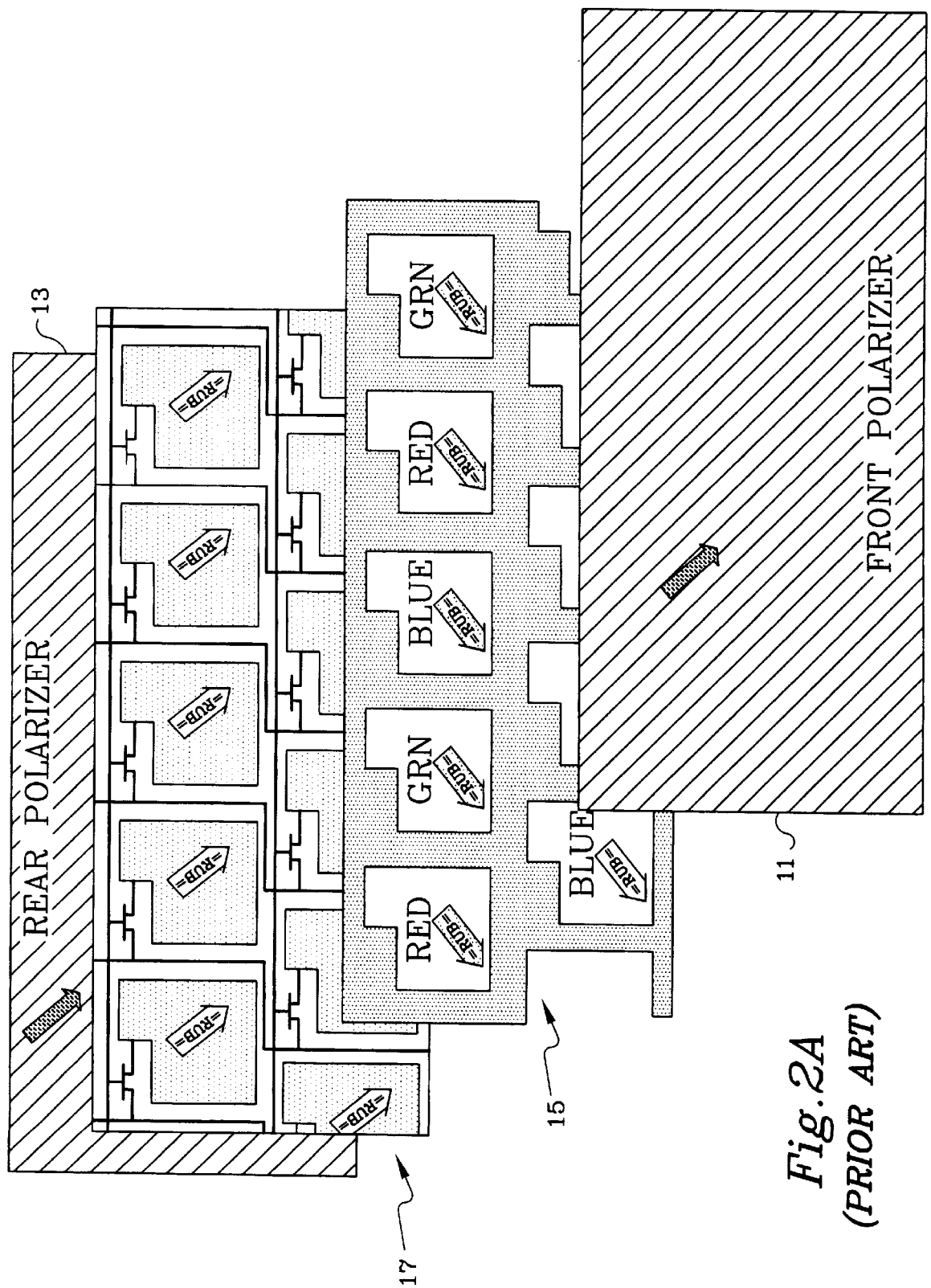
FIGS. 2A–2D are polarization and rubbing diagrams for a Normally Black Active Matrix Liquid Crystal Display having equal off state twist angles for all primary color segments (mono-twist).
Figure 2B:
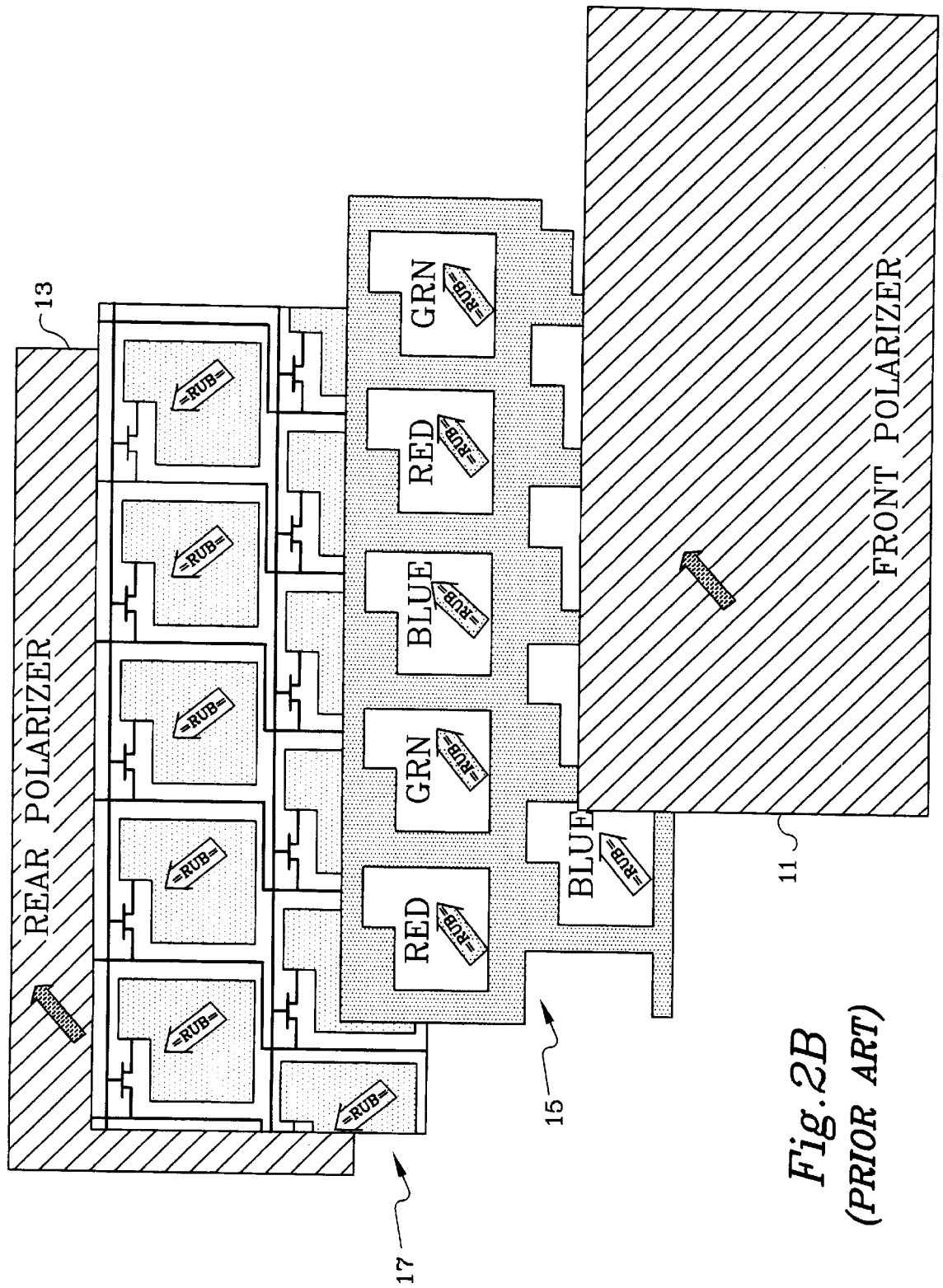

Four possible polarization and rubbing directions for these prior art devices are shown in FIGS. 2A–2D. In FIGS. 2A and 2B the polarizations of the front and rear polarizers are parallel at −45°. In FIG. 2A the active matrix alignment layer 17 is rubbed in a direction that is parallel to the polarization of the front and rear polarizers, while the color filter alignment layer 15 is rubbed in a direction that is perpendicular to the polarization of the front and rear polarizers. These rubbing directions and polarizations provide polarization twists that vary between 0° and 90° degrees, depending upon the voltages applied to the electrodes of the TFTs on the active matrix. When 0° twist is realized through the liquid crystal element, light is incident to the front polarizer with a polarization that is parallel to the front polarizer. Thus maximum light is emitted therefrom. The incident light is perpendicular to the polarization of the front polarizer when the voltages on the TFTs cause a 90° polarization twist between the front and rear polarizers. This 90° polarization twist causes the light to be perpendicular to the polarization of the front polarizer and minimum light is emitted therefrom.

Figure 2C:
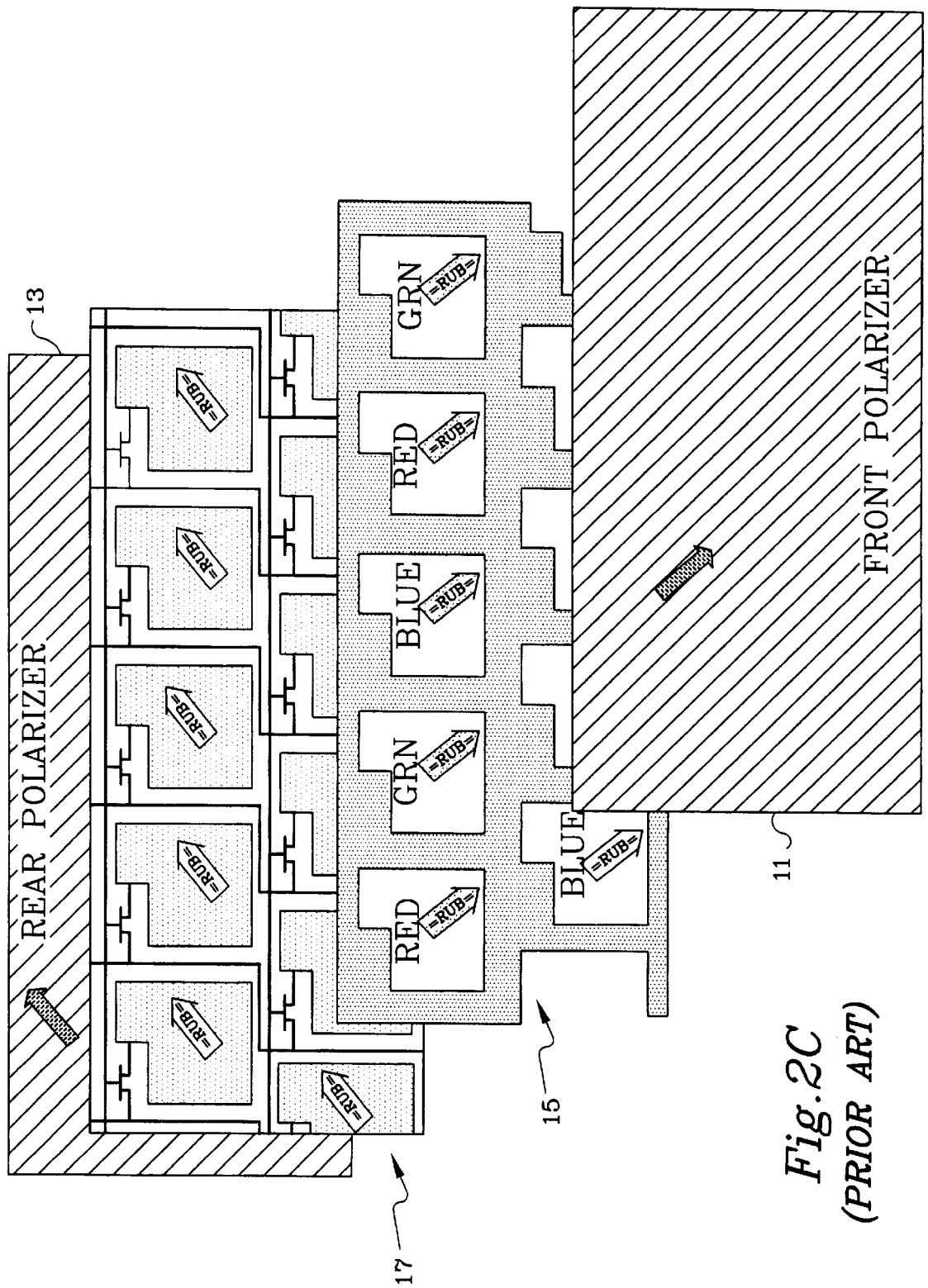
Figure 2D:
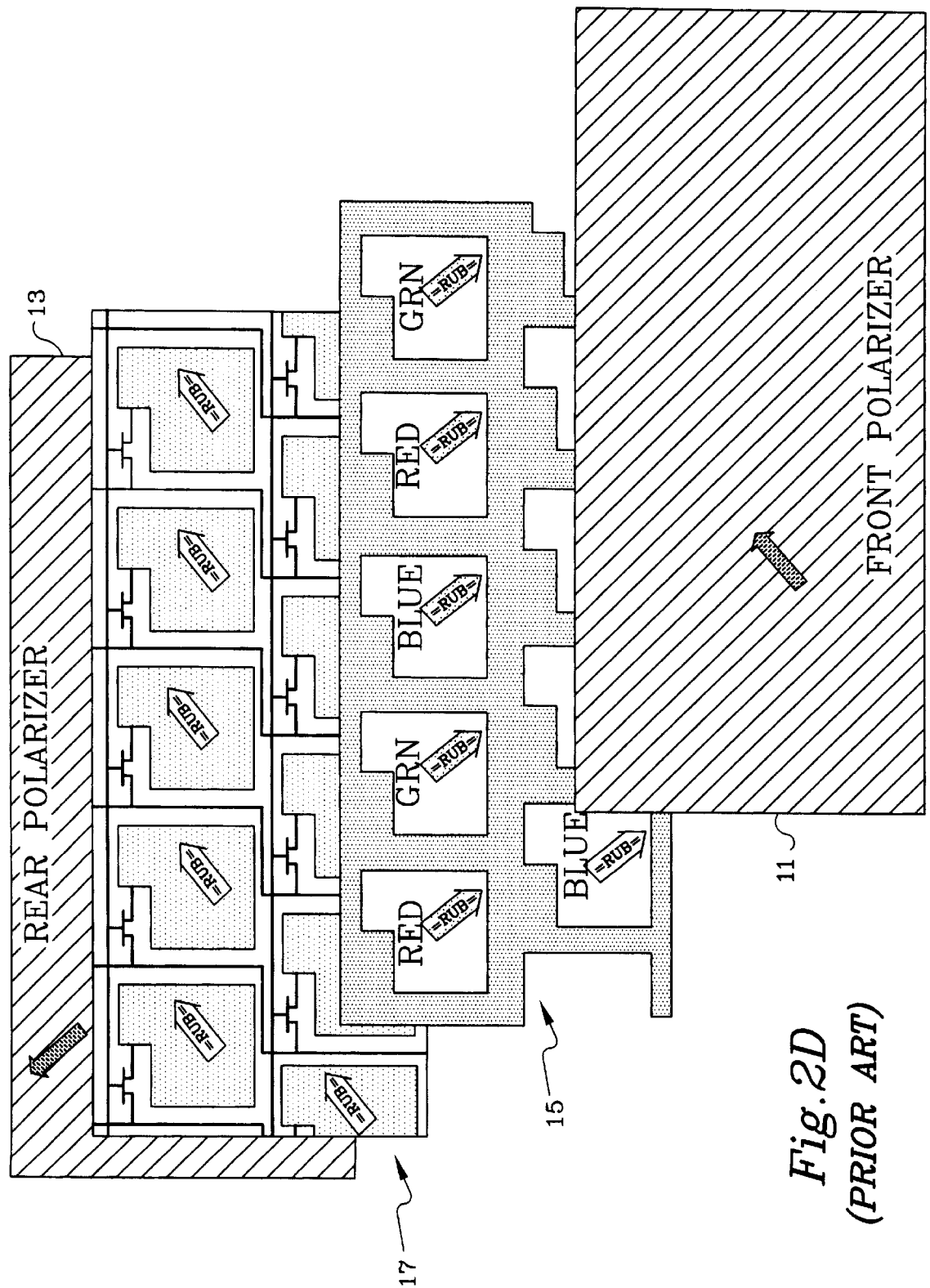

FIGS. 2C and 2D illustrate possible rubbing directions for configurations of the prior art when the front 11 and rear 13 polarizers have perpendicular polarizations. In FIG. 2C the color filter alignment layer and the active matrix alignment are rubbed parallel to the polarizations of the front and rear polarizers, respectively. In FIG. 2D the color filter alignment layer and the active matrix alignment layer are rubbed perpendicular to the polarizations of the front and rear polarizers, respectively. It should be understood that polarization twist across a liquid crystal is solely dependent upon the rubbing directions on either end of the crystal. The orientation of the rubbing direction relative to the incident polarization does not effect the polarization twist experienced by the light propagating through the crystal. The polarization of the light incident to the front polarizer from the rear polarizer, in the configurations of FIGS. 2C and 2D, is in quadrature with the polarization of the front polarizer when the liquid is in the 0° polarization twist state and is parallel to the polarization of the front polarizer when the liquid crystal is in the 90° state. Thus the emission of light from the front polarizer is minimum in the 0° polarization twist state and maximum in the 90° polarization twist state.

Polarization rotation is effected by the wavelength of the light, the proprties of the liquid crystal material and the cell gap length. Thus, a 90° polarization twist applied by the liquid crystal may not result in the ideal orientation of the light polarization incident to the front polarizer for minimum light emission from the front polarizer for the configurations of FIGS. 2A and 2B or maximum light emission from the front polarizer for the configurations of FIGS. 2C and 2D.

Figure 1B:
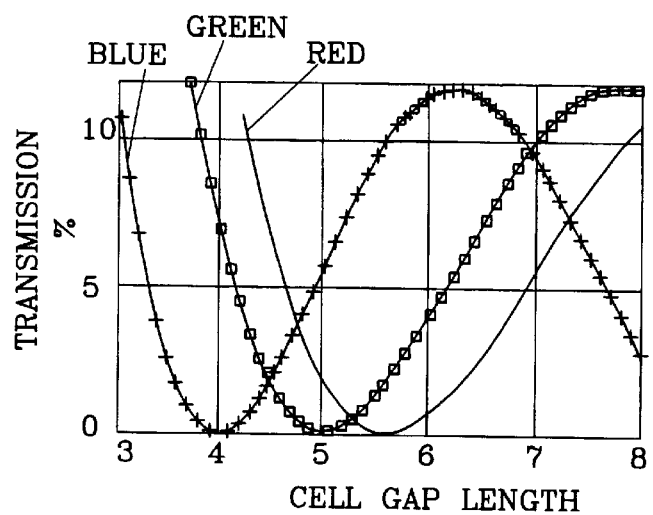
FIG. 1B is a plot of light transmission vs. cell gap length for the primary color segments of FIG. 1A.

Refer now to FIG. 1B wherein off state light transmission as a function of cell gap for the primary colors of the display 10 are shown. This figure, which is representative of the polarization orientations-rubbing directions shown in FIGS. 2A and 2B, clearly indicates that the gap lengths for substantially zero light transmission differ for each color, being four microns for blue, five microns for green, and five and a half microns for red Consider, for example, a mono-gap active matrix display having a uniform cell gap of five microns. With this construction substantially zero green light incident to the rear polarizer is transmitted through the front polarizer, while three percent of the red light and six percent of the blue light are transmitted. To achieve a perfectly black off state, the transmissions must be zero over the entire color range. Consequently, a low level off state luminance having a color that corresponds to the luminance levels of the transmitted light results.

Figure 3A:
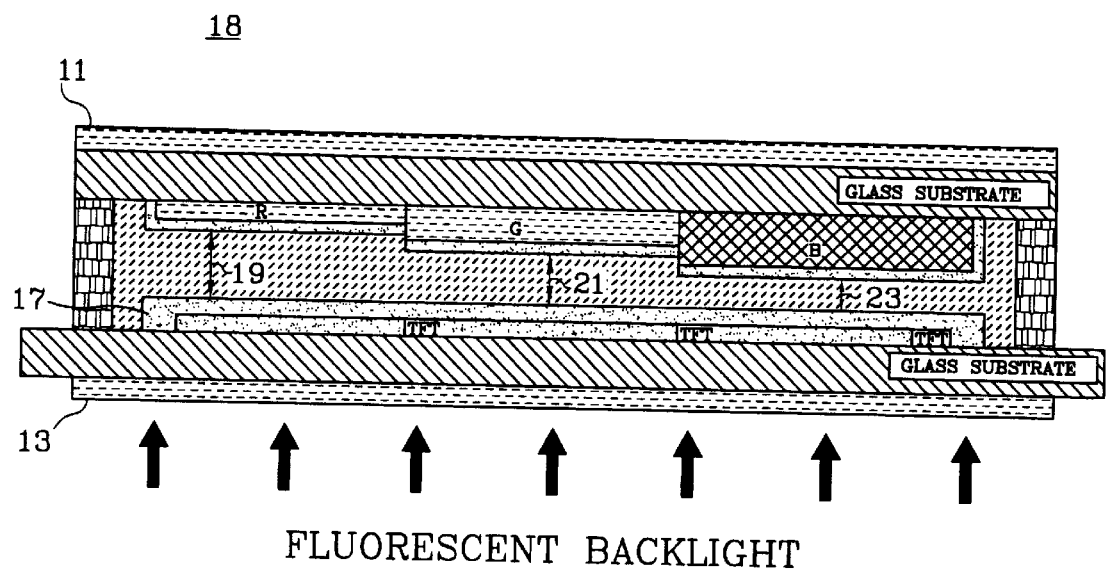
FIG. 3A is a schematic sketch of a Twisted Nematic Active Matrix Color Liquid Crystal Display for which the primary color cell gaps are of different lengths (multi-gap) and the off state polarization twist angles are equal for all the primary colors (mono-twist).
Figure 3B:
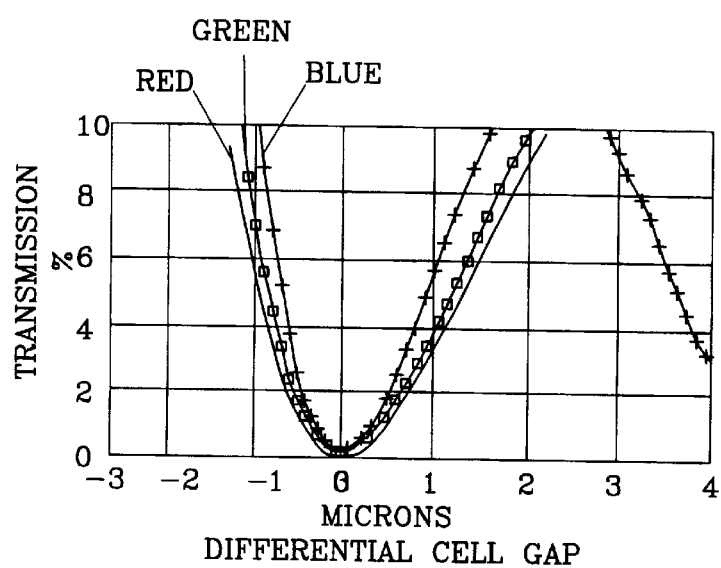
FIG. 3B is a plot of light transmission vs. differential cell gap for the primary color segments of FIG. 3A.

Significant reductions in off state luminance may be realized by providing a multi-gap construction. In such a construction the gap lengths for each filter are selected to provide minimum off state light transmission, as indicated in FIG. 1B. A multi-gap, mono-twist color liquid crystal display 18 is illustrated in FIG. 3A, wherein elements similar to elements in FIG. 1A bear the same reference numeral. As illustrated in FIG. 3A, the cell gap for each primary color filter has a length which is equal to that at which substantially zero transmission occurs for the filter color. As for example, the red filter gap length 19 may be 5.5 microns, the green filter gap length 21 may be 5.0 microns and the blue filter gap length 23 may be 4.0 microns. These are the gap length indicated in FIG. 1B at which the off state light transmission is substantially zero. The gap lengths in such displays, however, must be controlled to very tight tolerances. The extent to which the tolerances must be held is illustrated in FIG. 3B, which is a plot of light transmission vs. differential cell gap for the multi-gap, mono-twist display of FIG. 3A. It should be apparent from the figure that a difference of 0.5 microns in the gap of the each filter increases the light transmission through the blue filter to 2 percent of the light incident to the rear polarizer, the light transmission through the green filter to 1.2 percent, and the light transmission through the red filter to 1.1 percent.

Figure 4A:
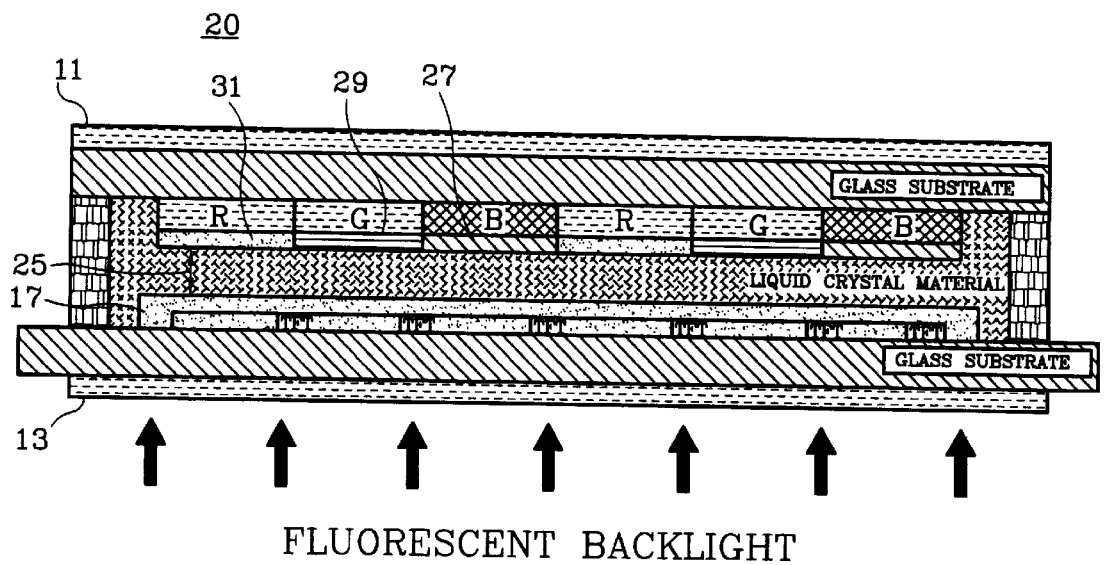
FIG. 4A is schematic sketch of a Twisted Nematic Active Matrix Color Liquid Crystal Display constructed in accordance with the principles of the invention.
Figure 4E:
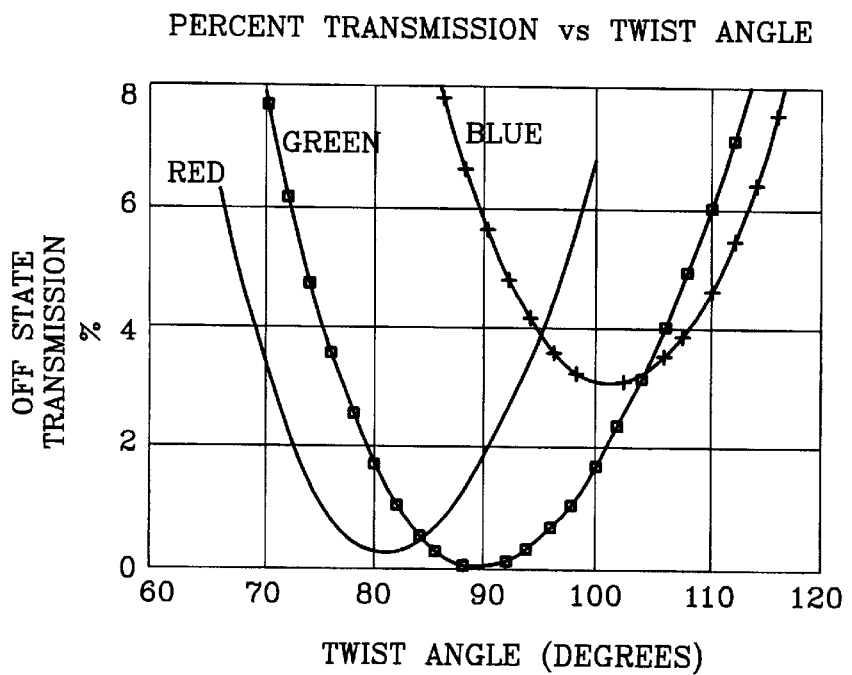
FIG. 4E is a plot of off state light transmission vs. twist angle for the primary color segments of FIG. 4A.
Figure 4B:
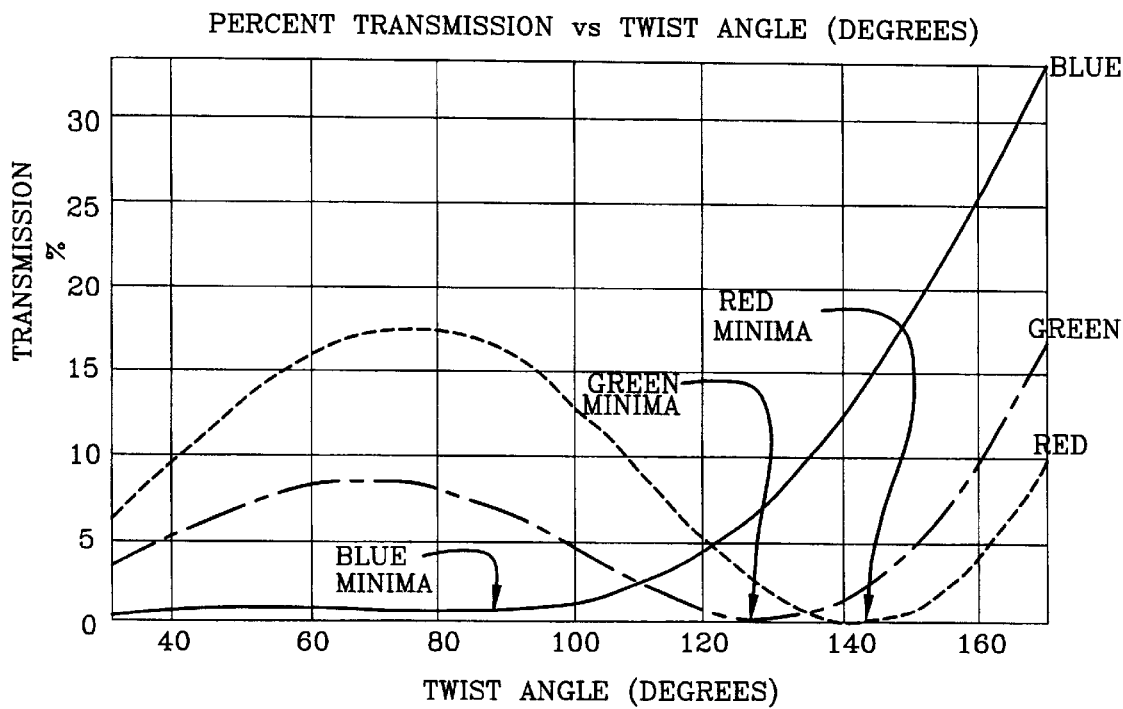
FIG. 4B is a plot of off state light transmission vs. twist angle for the primary color segments of FIG. 4A wherein the primary color cell gap lengths are equal.
Figure 4C:
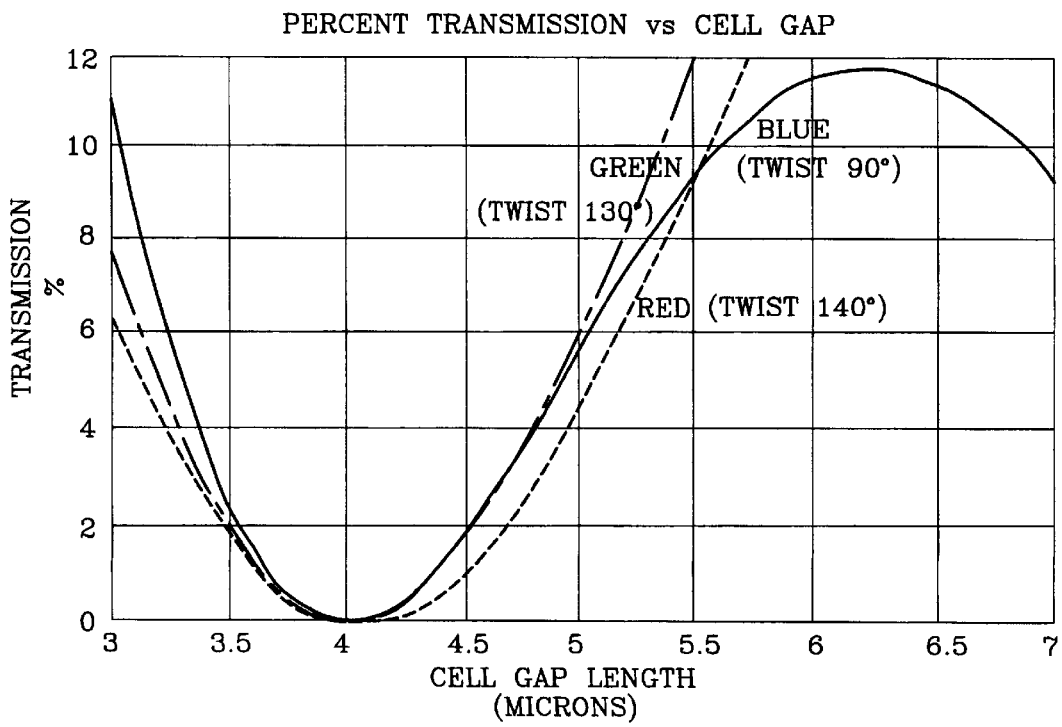
FIG. 4C is a plot of off state light transmission vs. cell gap length for the primary color segments of FIG. 4A with different off state twist angles.

A mono-gap, multi-twist back lighted color display 20 is illustrated in FIG. 4A, wherein an element similar to an element shown in previously discussed figures bares the same reference numeral. The front polarizer 11 and rear polarizer 13 may be polarized, as shown in FIGS. 2A and 2B, to have parallel polarizations at −45° and +45°, respectively. In these embodiments of the invention, the active matrix alignment layer 17, for all corresponding color cells, may be rubbed in a direction parallel to the front and rear polarizers. To establish off state minimum light transmission the alignment layers at the color filters are rubbed in different directions. FIG. 4B is a plot of light transmission versus polarization twist angle for a display having a gap width 25 of 4 microns for each color filter. It is evident from this plot that light transmission through the front polarizer is substantially zero for blue at a polarization twist angle of 90°, for green at a polarization twist angle of 130°, and for red at a polarization twist angle of 140°. Thus, if the twist angle at the blue filter 27 is 90°, at the green filter 29 is 130° and at the red filter 31 is 140° a normally black off state results. FIG. 4C is a plot of off state transmission versus cell gap for a display that has been rubbed to provide a polarization twist of 90° for blue, 130° green, and 140° for red. It is readily apparent from this figure that the off state transmission is zero for all three colors and is substantially below 2% for a gap range between 3.5 and 4.5 microns.

Figure 4D:
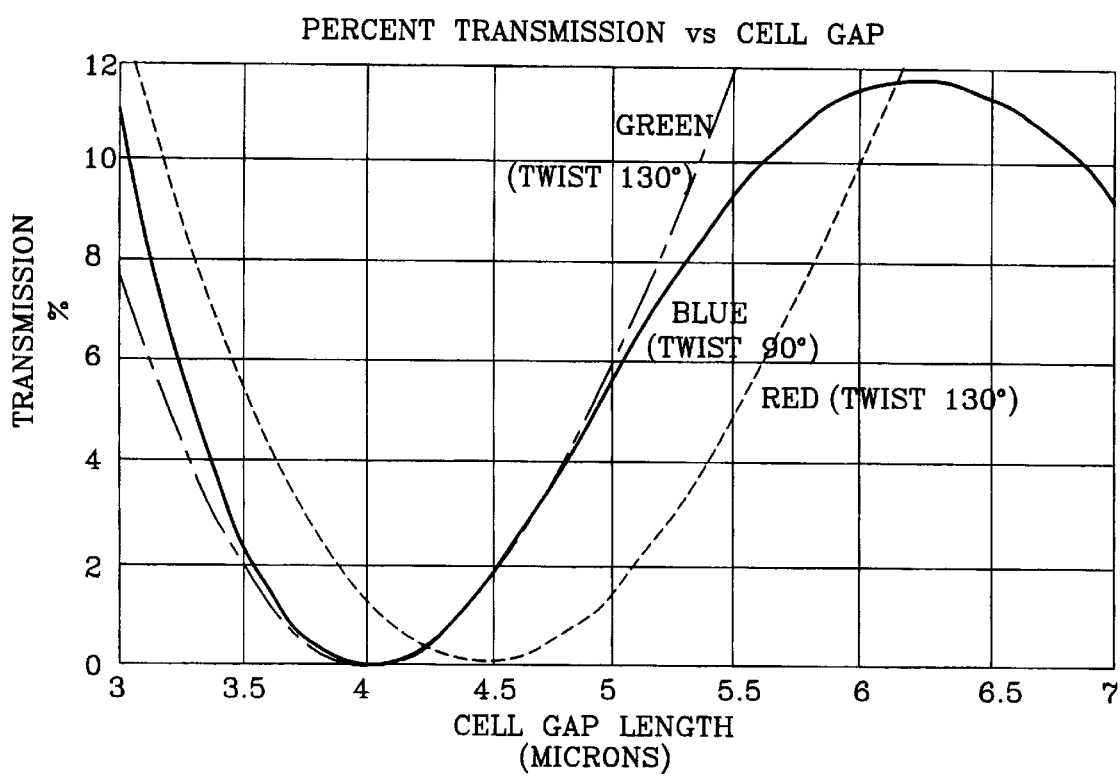
FIG. 4D is a plot of off state light transmission vs. cell gap length for the primary color segments of FIG. 4A with off state twist angles that differ from those of FIG. 4C.

A combination of multi-gap and multi-twist may be employed to achieve a black off state with some simplification in the rubbing procedure. A construction of this type may be implemented with the aid of FIG. 4D, which is a plot of off state transmission versus cell gap In this configuration the green and red filter cells on the color filter alignment layer and the corresponding cells on the active matrix alignment layer are rubbed to achieve a 130° polarization twist across the liquid crystal, while the blue cell on the color filter alignment layer and its corresponding cell on the active matrix alignment are rubbed to realize a 90° polarization twist. The cell gaps for blue and green are equal to 4 microns, while the red cell gap is 4.5 microns. Thus, a normally black off state is achieved with only two rubbing direction and only two different cell gaps.

Though normally black off state displays may be achieved, with a mono-gap configuration, by practicing this invention with the polarization twists above discussed, it is desirable to maintain the rubbing directions on the active matrix alignment layer and the color filter alignment layer substantially perpendicular to one another. To accomplish this, polarization twists in the order of 90° for all the color filters are required. Refer now to FIG. 4E wherein off state light transmission as a function of polarization twist for a cell gap of 5 microns is shown. It is readily seen, from this plot, that the desired 90° twist and zero light transmission is achieved for the green filter. Zero light leakage, however, cannot be achieved, with the five micron mono-gap, for the red and blue filters. As indicated in FIG. 4E, minimum off state light transmission for the red and blue filters may be realized at acceptable polarization twists of 80° and 100°, respectively. At these polarization twists, off state transmission is reduced to 2% and 5.5% of the red and blue light, respectively, available. This reduction is sufficient for an acceptable off state display.

Figure 5A:
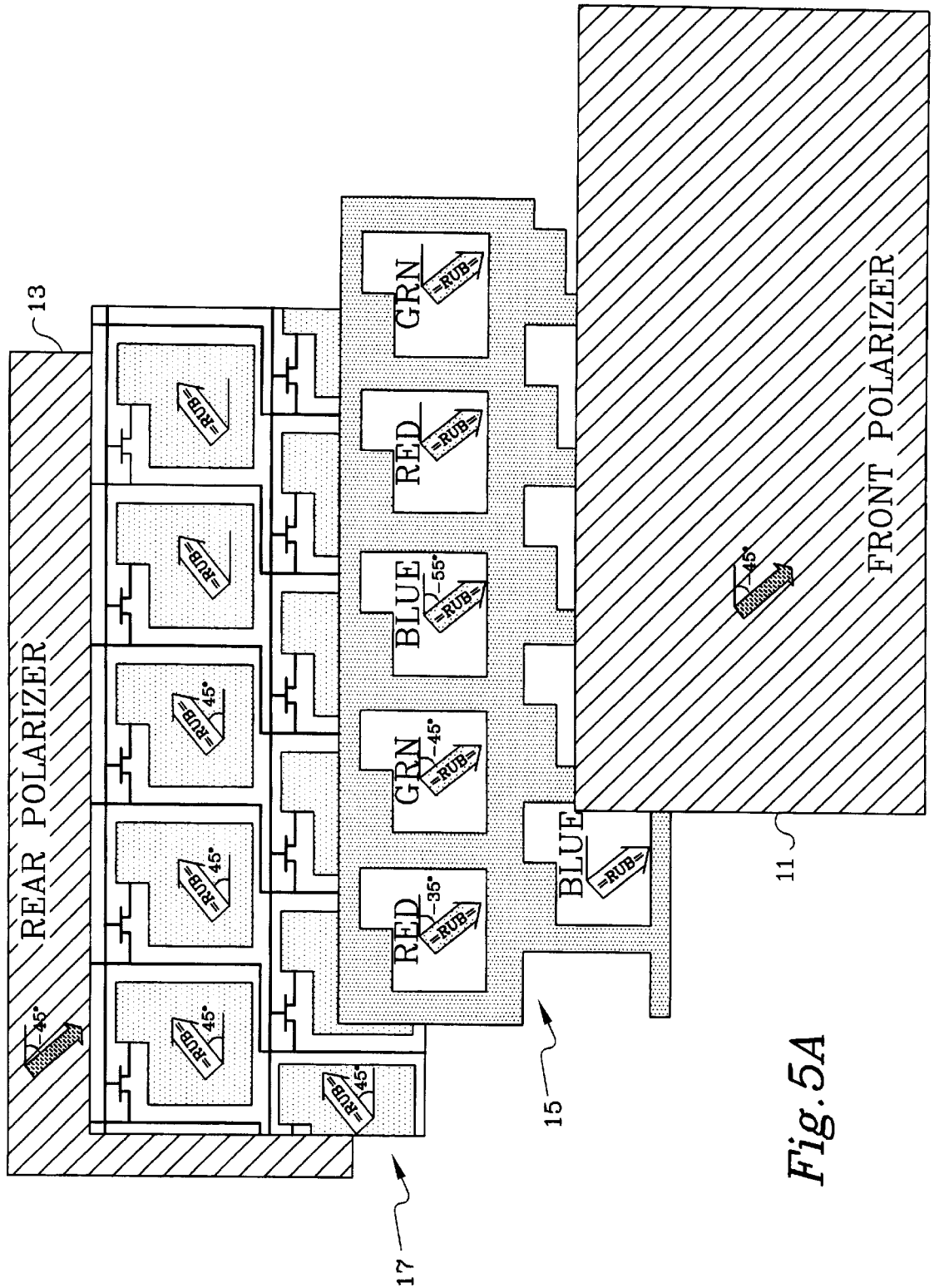
FIGS. 5A–5D, 6A–6C, and 7 are polarization and rubbing diagrams for a Twisted Nematic Active Matrix Color Liquid Crystal Display constructed in accordance with the principles of the invention.

A diagram indicating the resulting relative polarizations and rubbing directions of the display components for the polarization twists of 80° for red, 90° for green, and 100° for blue, when the rubbing directions on the active matrix alignment layer 17 is perpendicular to the polarization of the rear polarizer 13 for all the color filter segments, is given in FIG. 5A. In this configuration the rubbing directions on the color filter alignment layer 15 at the red and blue color cells are, respectively, plus and minus 10° from being parallel to the polarization orientation of the front polarizer 11, while the rubbing direction for the green filter is parallel to the polarization orientation of the front polarizer 11.

Figure 5B:
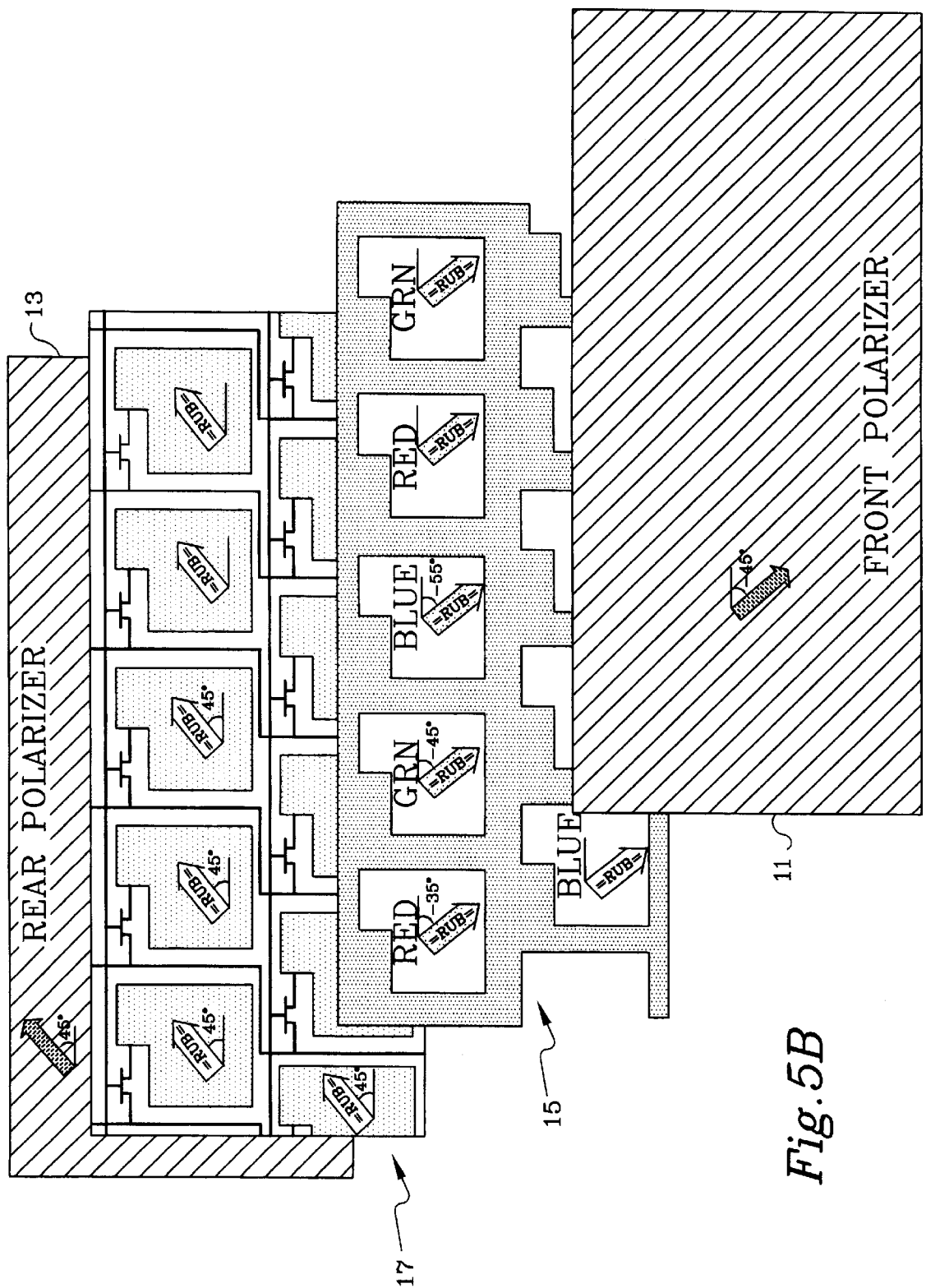
Figure 5C:
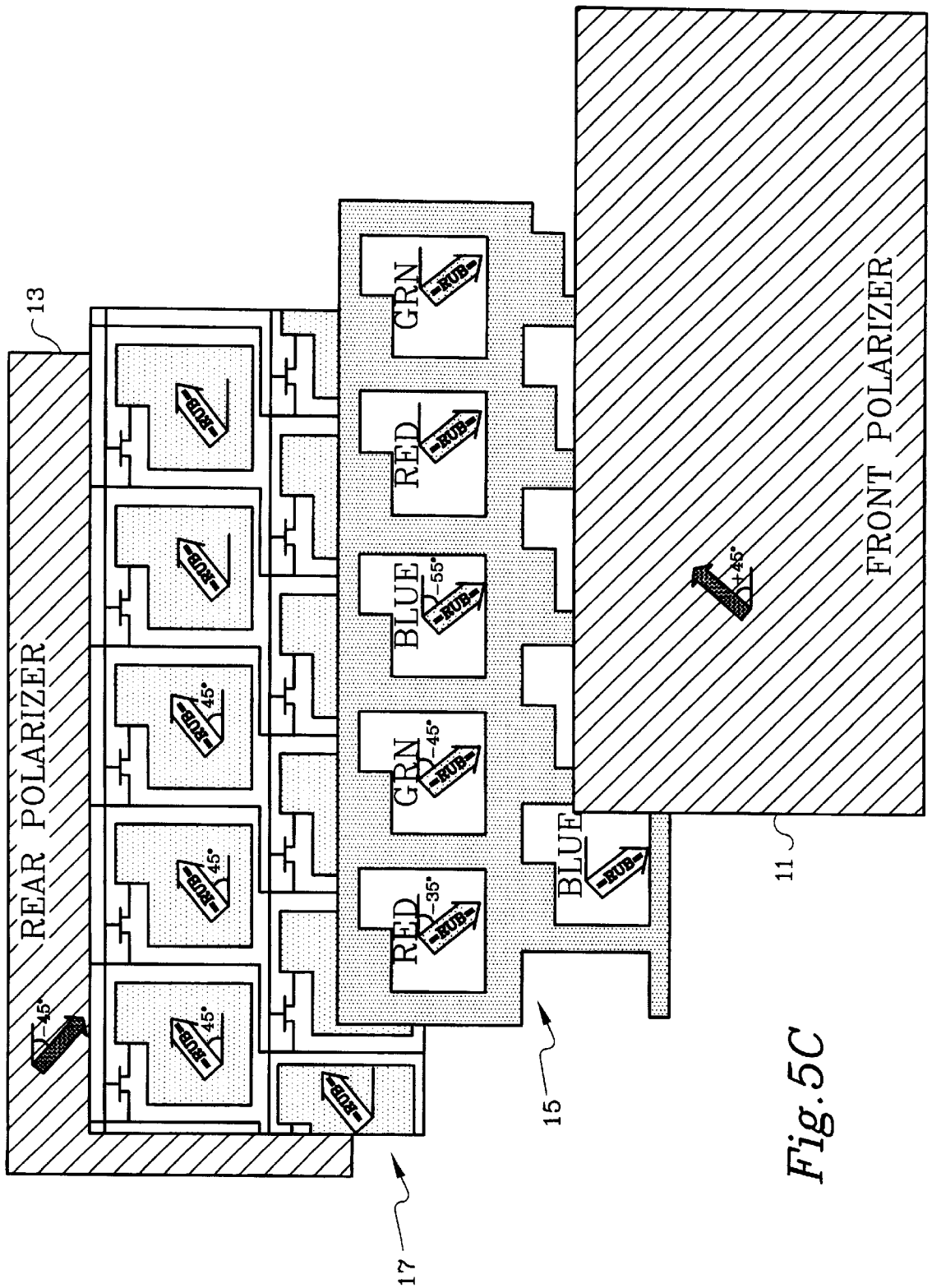
Figure 5D:
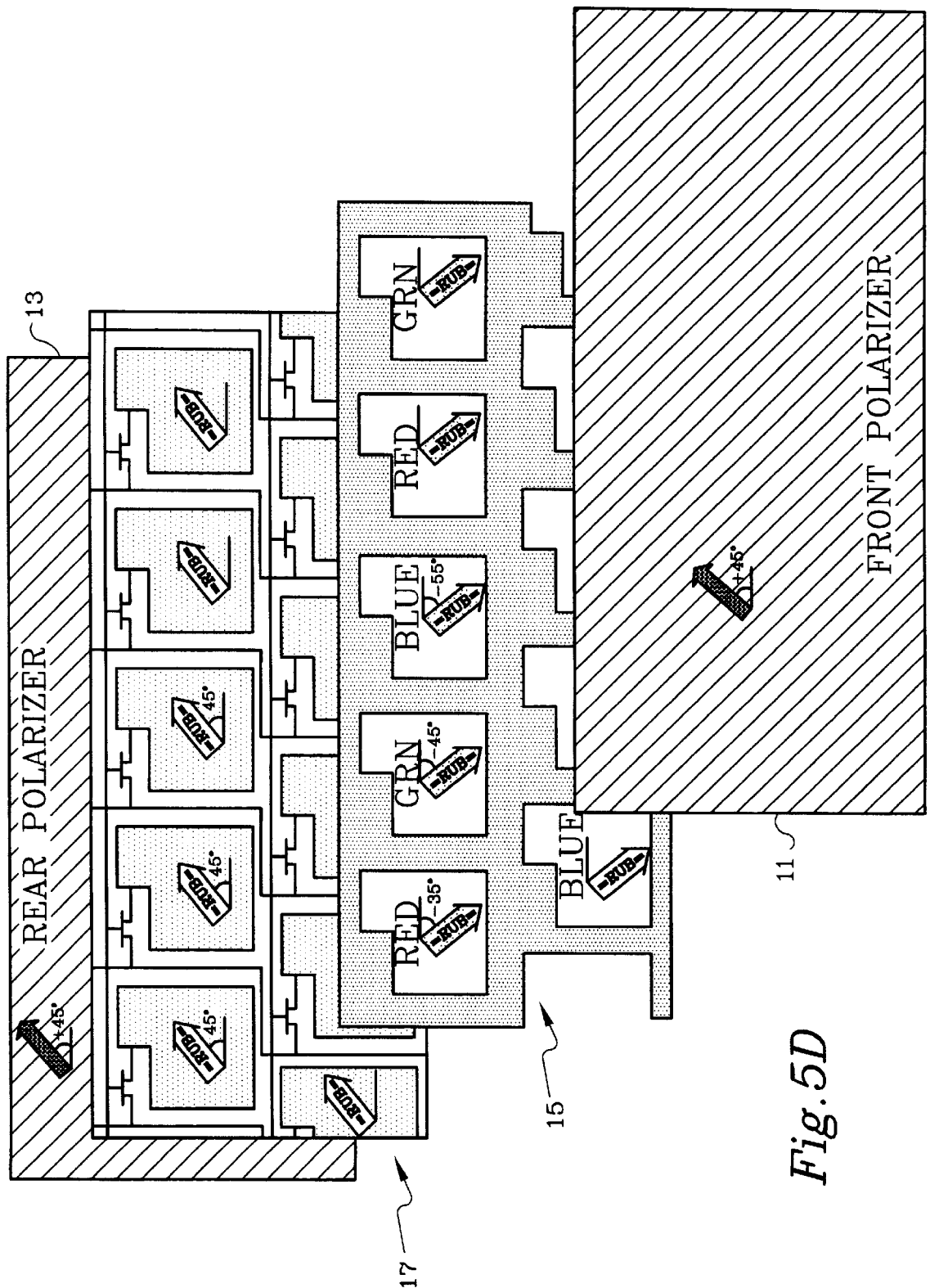
Figure 6A:
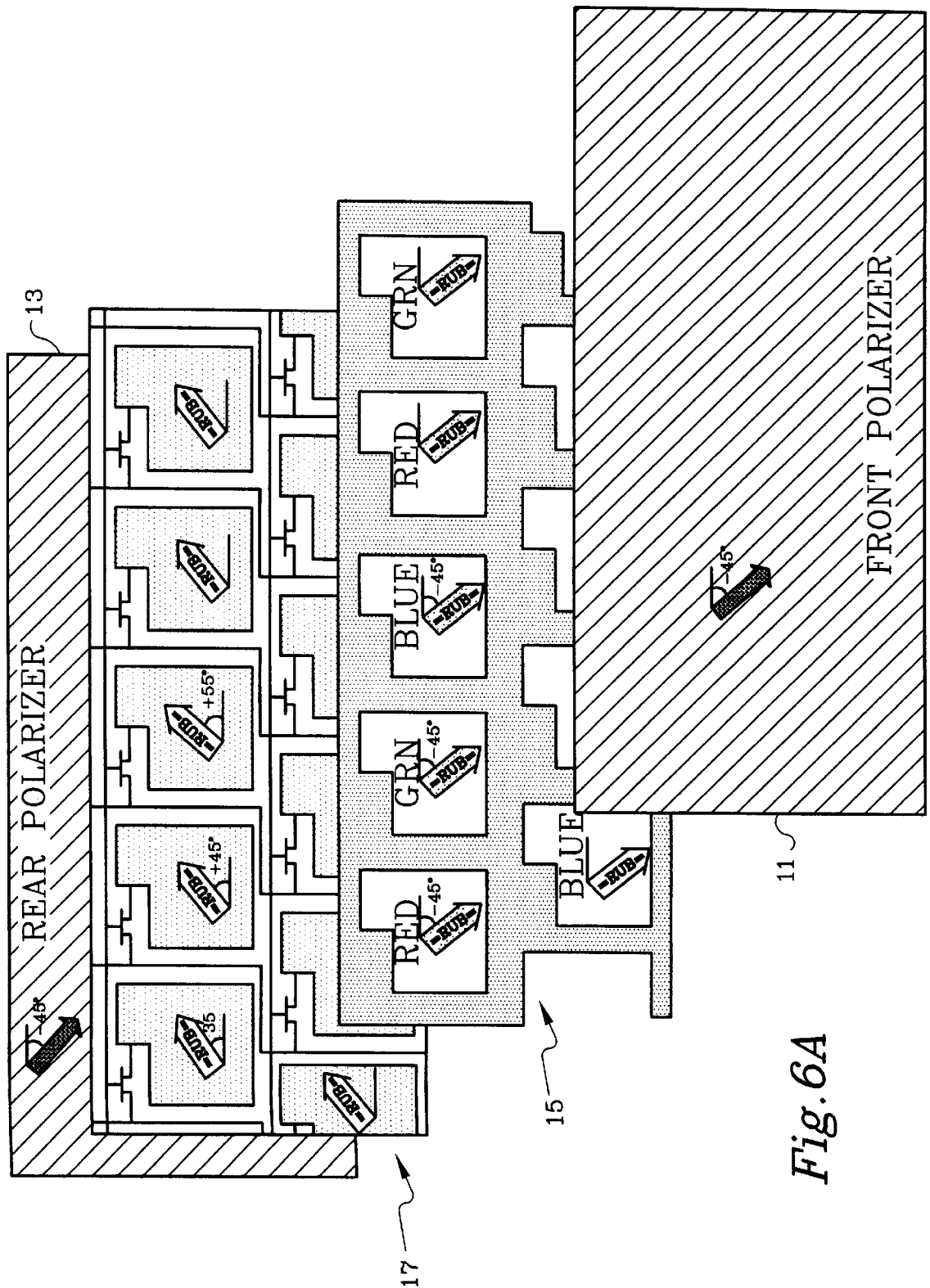
Figure 6B:
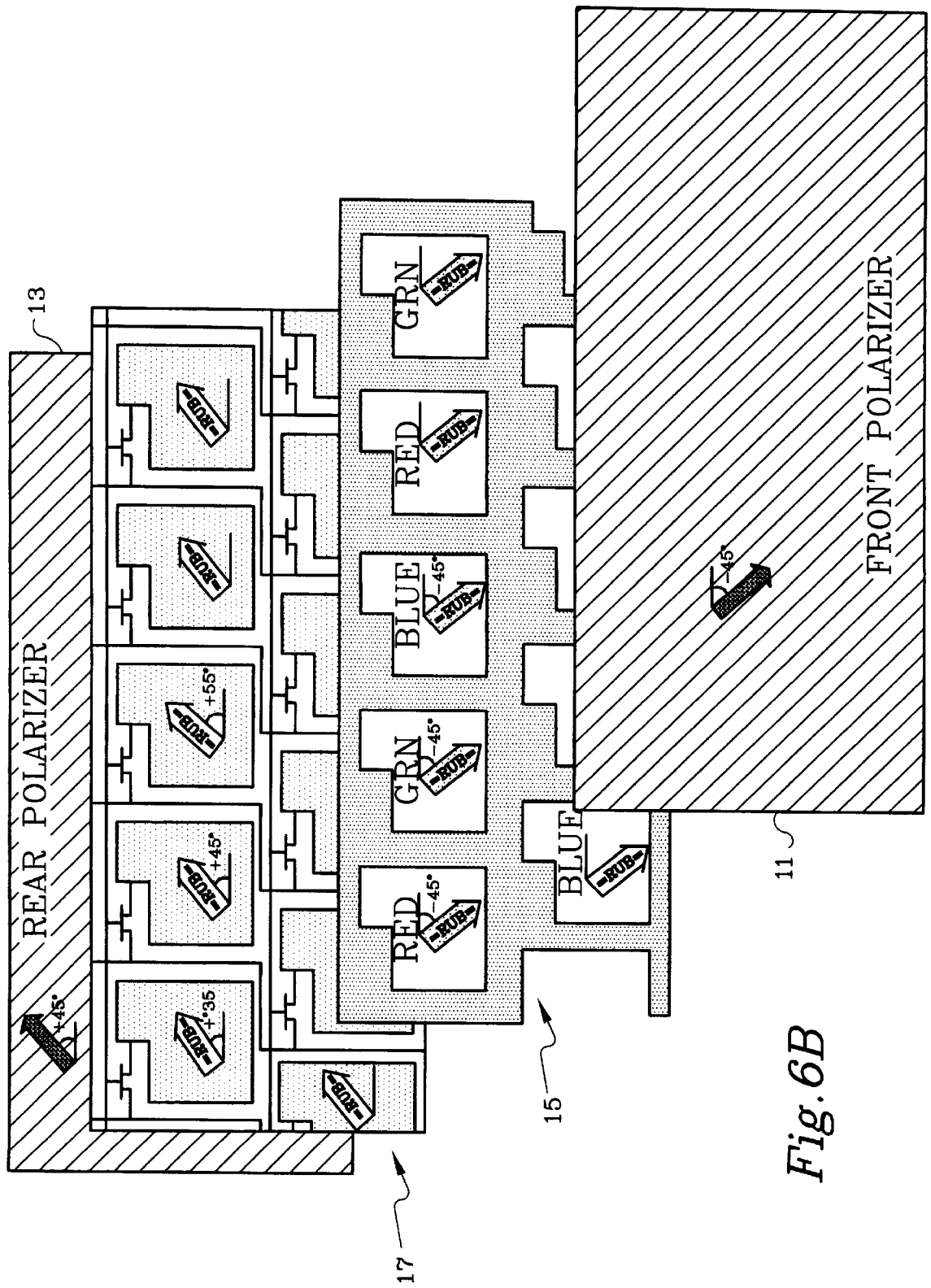
Figure 6C:
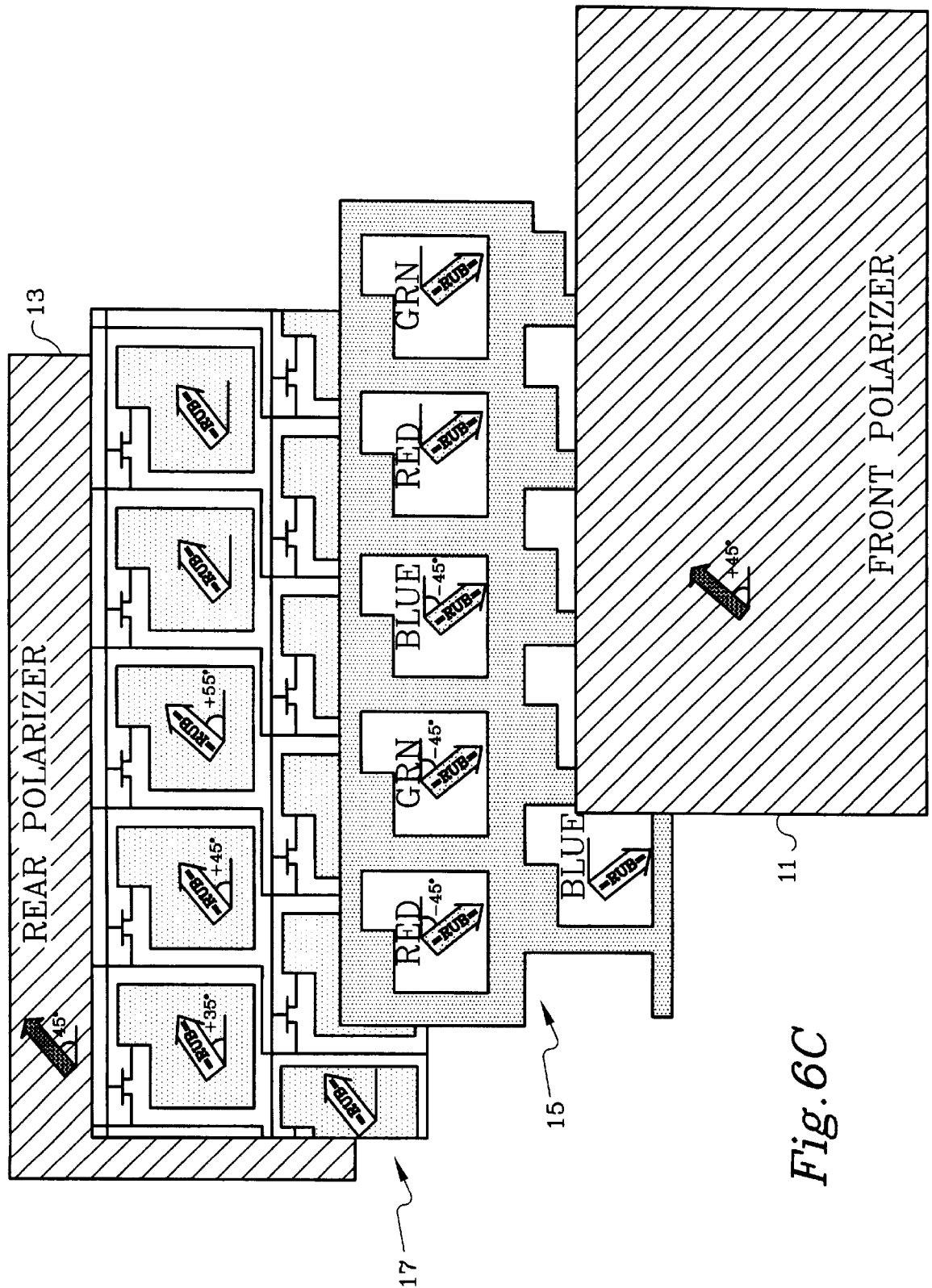

Since the polarization twist is not a function of the orientation of the rubbing direction on the active matrix alignment layer 17 to the polarization of the rear polarizer 13, zero off state light emission from the front polarizer 11 will also be realized if the polarization of the rear polarizer 13 was oriented at +90° and therefor parallel to the rubbing direction on the active matrix alignment 17 layer, as shown in FIG. 5B Further, with the rubbing directions on the color filter 15 and active matrix 17 alignment layers as shown in FIGS. 5A and 5B, zero off state light emission can also be obtained when the polarization of the front polarizer 11 is perpendicular to the rubbing direction on the color filter alignment layer 15, as shown in FIGS. 5C and 5D. It should be recognized that the alignment layer of the color filters may be rubbed to have all the color filters at −45° and thereby in parallel with a polarization of −45° for the front polarizer as shown in FIGS. 6A and 6B or perpendicular to a polarization of +45° for the front polarizer, as shown in FIG. 6C. To provide the desired twist angles between the alignment layers at the color filters and the active matrix, the alignment layers at the active matrix are then rubbed to have the red segment polarized at +35°, the green segment at +45°, and the blue segment at +55°, as shown in FIGS. 6A–6C. With these polarizations, the rubbing directions on the active matrix alignment layer 17 for the red and blue segments are respectively minus and plus 10° from being perpendicular to the polarization of the rear polarizer 13 in FIG. 6A and respectively plus and minus 10° from being parallel to the polarization of the rear polarizer 13 in FIGS. 6B and 6C. The rubbing direction for the green filter is perpendicular to the rear polarizer in FIG. 6A, while in FIGS. 6B and 6C it is parallel to the rear polarizer.

Figure 7:
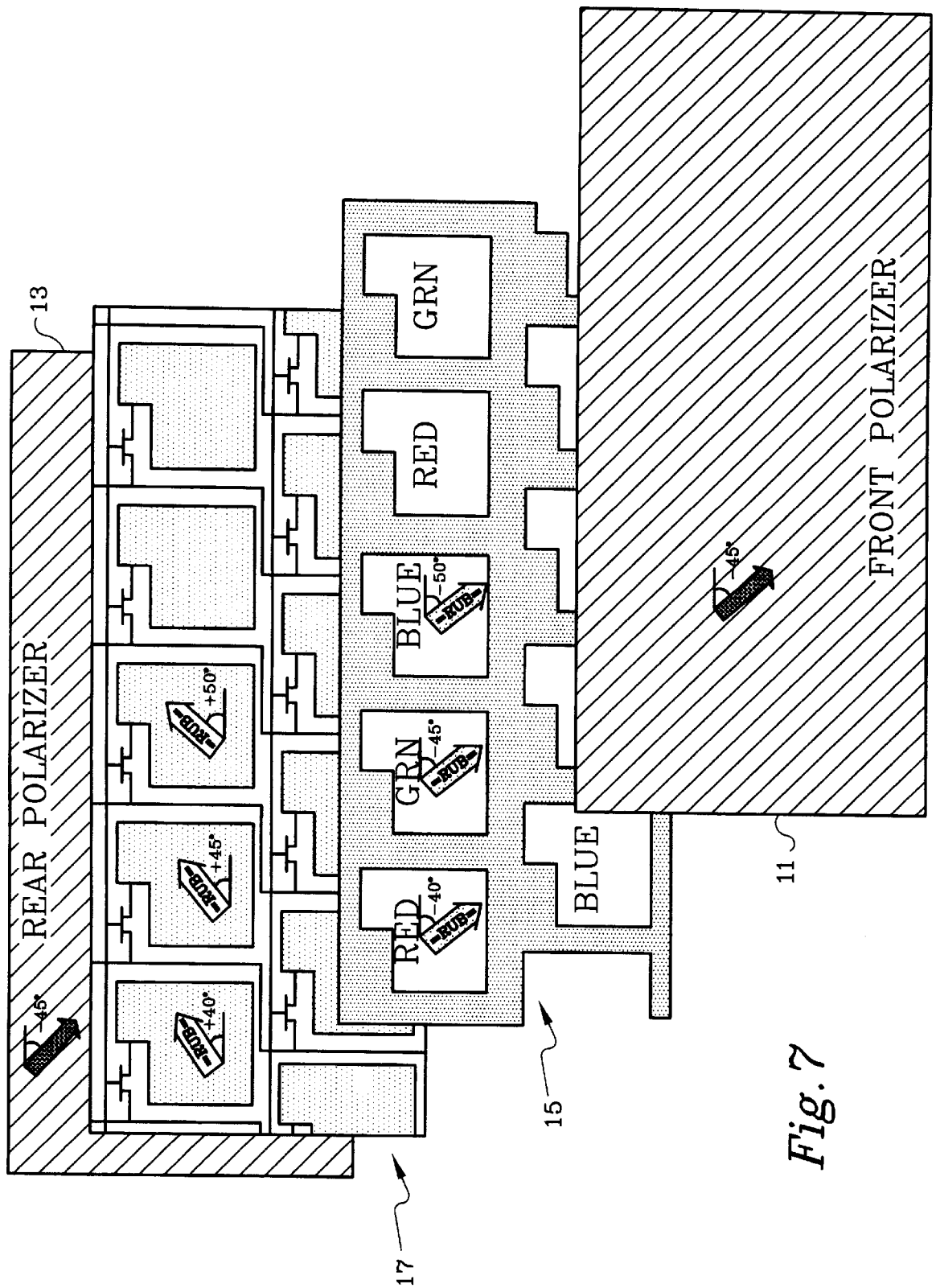

The 10° off set angles, shown in FIGS. 5A, 5B, and 6A–6C may be reduced to 5° at each alignment layer with slight alterations in the rubbing directions. For example, the red and blue segments of the active matrix alignment layer 17 of FIG. 5A may be rubbed at +40° and +50°, respectively, and the red and blue segments of the color filter alignment layer 15 may be rubbed at −40° and −50°, respectively. These rubbing directions maintain the respective 80° and 100° off state polarization twists across the liquid crystal for red and blue filters. A polarization and rubbing direction diagram, for a −45° polarization of the rear polarizer, which is representative of this implementation is shown in FIG. 7.

It is well known that rubbing of the alignment layers can tilt the molecules of the liquid crystal relative to the rubbing surface. The degree of tilt is a function of the rubbing pressure and the alignment material, which, for example, may be a polyimide material. This tilting characteristic may be utilized to provide a liquid crystal display with a mono-gap construction which has a normally black display in the off state.

Figure 8A:
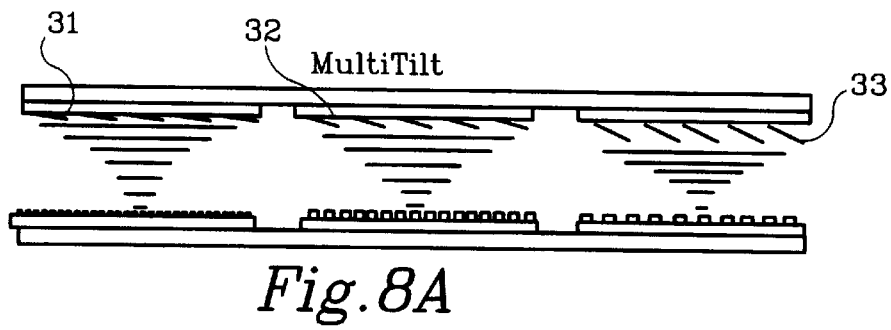
FIGS. 8A and 8B are pictorial diagrams useful for comparing liquid crystal molecular tilt in a mono-gap Twisted Nematic Active Matrix Color Liquid Crystal Display to a multi-gap Twisted Nematic Active Matrix Color Liquid Crystal Display.
Figure 8B:
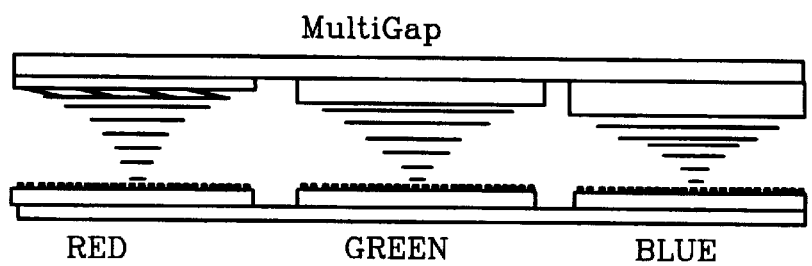

For a given mono-gap, rubbing may be performed in a manner to tilt the liquid crystal molecules at the rubbing surfaces differently for the three primary colors, as for example, as shown in FIG. 8A, a zero tilt 31 for red, an intermediate tilt 32 for green, and a maximum tilt 33 for blue. A comparison of the multi-tilt representation of FIG. 8A with the multi-gap representation of FIG. 8B indicates that the molecule tilt at the rubbing surface tends to shorten the channel gap, the greater the tilt the shorter the gap.

Figure 9:
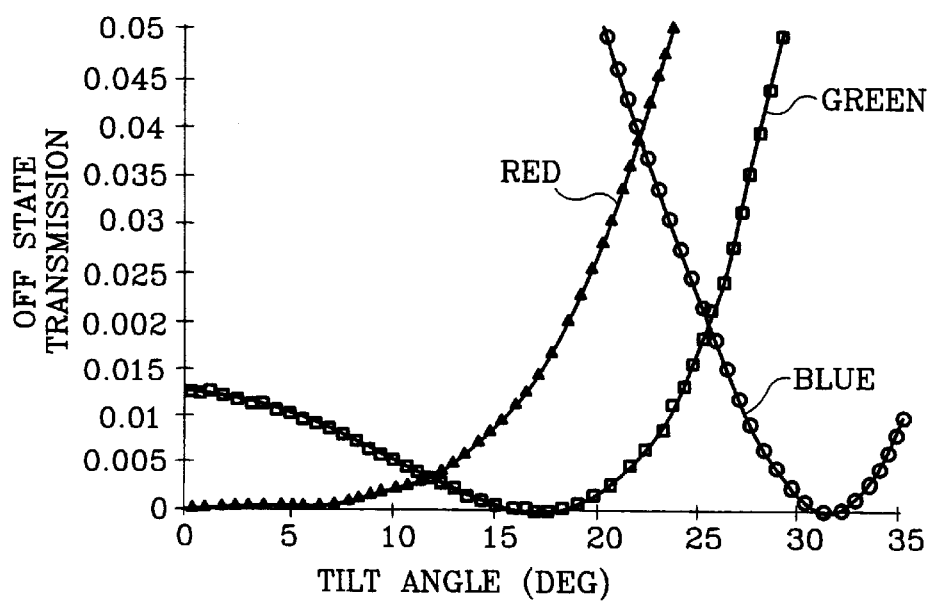
FIG. 9 is a plot of off state transmission vs. tilt angle for the primary colors in the configuration of FIG. 8A.

FIG. 9 is a plot of Off State Transmission versus Tilt Angle for a mono-gap of 6 microns and a mono-twist of 90°. Utilizing this information, a mono-gap, mono-twist, multi-tilt, normally black display may be obtained for a mono-gap of 6 microns and a mono-twist of 90° with a molecular tilt of 0° for the red channel, 18° for the green channel, and 32° for the blue channel.

Figure 10:
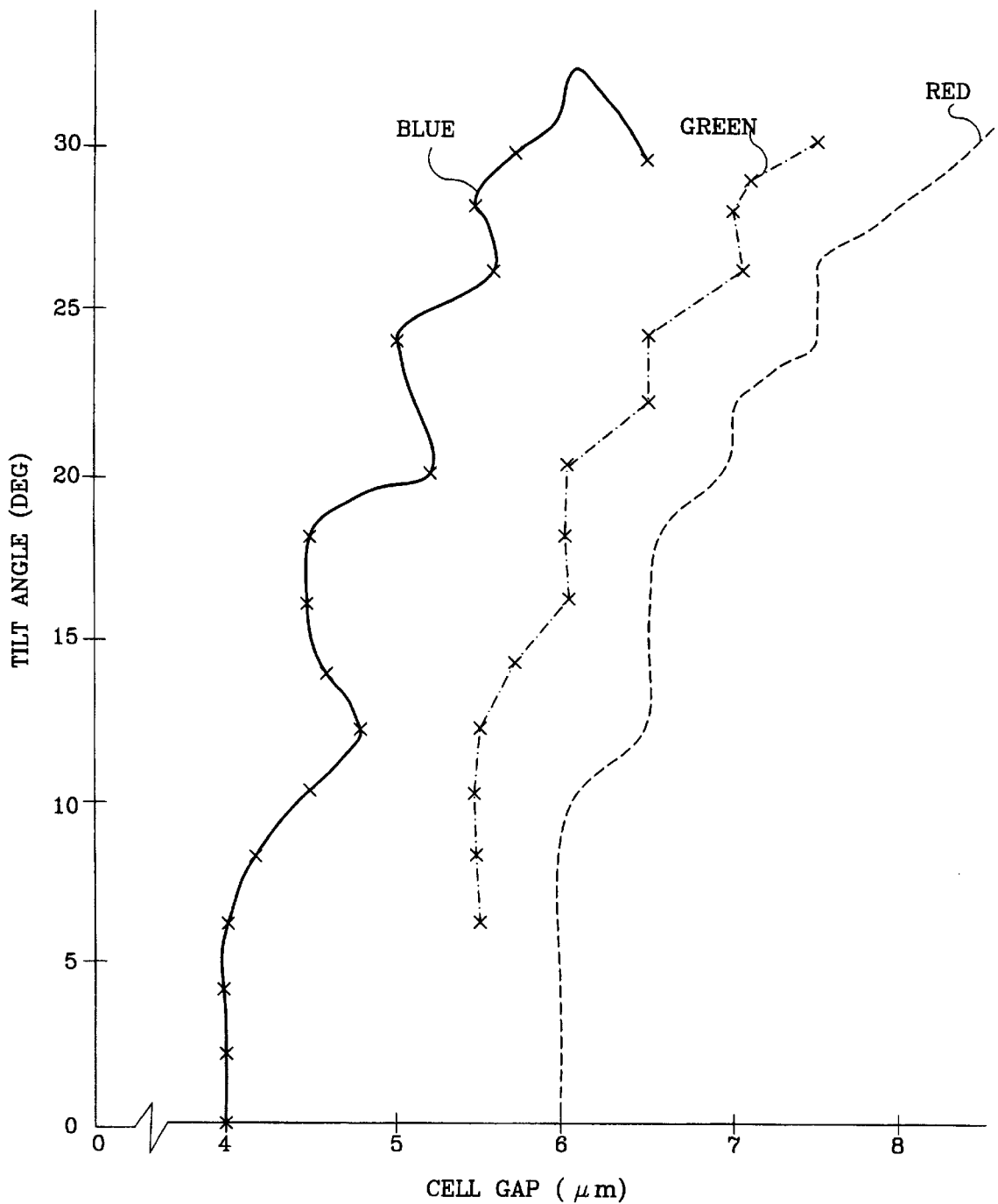
FIG. 10 is a plot of tilt angle vs. cell gap length for substantially zero off state light transmission.

Normally black displays may also be obtained by combining multi-twist with multi-tilt. Refer to FIG. 10, wherein plots of Tilt Angle versus Cell Gap at which zero off state light transmission occurs for the blue, green, and red filters at a mono-twist of 90° are presented, and again to FIG. 4E. It is apparent from FIG. 4E that 3% of the blue light leaks through the liquid crystal in the off state at a twist angle of 100° for a 5 micron mono-gap display. This can be significantly improved by providing a 90° twist angle for the blue filter and creating a 20° tilt angle, at which substantially zero blue light leakage occurs for a gap of 5 microns, as indicated in FIG. 9.

It should be evident that various combinations of multi-gap, multi-twist, and multi-tilt, play may be employed to achieve normally black, backlighted, liquid crystal displays.

While the invention has been described in its preferred embodiments, it is to understood that the words used are words of description rather than limitation and that changes may be made within the purview of the appended claims without departing from the true scope and spirit of the invention in its broader aspects.

We claim:

1. A backlighted liquid crystal color display including a first polarizer having a first polarization orientation and a second polarizer having a second polarization orientation, a multiplicity of optical filter sets, each set including a plurality of primary color filters, first and second alignment layers respectively positioned adjacent said first and second polarizers, each said alignment layer having primary color regions respectively aligned with said primary color filters, spacing between said first and second alignment layers forming cell gaps in all color regions, and liquid crystal material disposed between said first and second alignment layers wherein said first and second alignment layers are rubbed in said primary color regions in directions that provide polarization twist angles between said first and second polarizers in said primary color regions in a manner that provides a polarization twist angle for at least one primary color that differs from that of all other primary color polarization twist angles, wherein said first alignment layer is rubbed in a direction substantially parallel to said first polarization orientation in a first primary color region and in directions within an angular range of plus and minus 10° of said first polarization orientation in other primary color regions.

2. A backlighted liquid crystal color display in accordance with claim 1 further characterized in that said primary color regions on second alignment layer are rubbed in directions within an angular range of plus or minus 10° from said second polarization orientation.

3. A backlighted liquid crystal color display in accordance with claim 1 further characterized in that said primary color regions on second alignment layer are rubbed in directions within an angular range of plus or minus 10° from a perpendicular to said second polarization orientation.

4. A backlighted liquid crystal color display in accordance with claim 1 further characterized in that said first and second polarization orientations are parallel, and said second alignment layer is rubbed in regions of only one primary color in a direction that is perpendicular to said parallel polarization orientations.

5. A backlighted liquid crystal color display in accordance with claim 4 further characterized in that said primary color regions on said second alignment layer, other than said regions of said one primary color, are rubbed in directions within an angular range of plus or minus 10° from said parallel polarization orientations.

6. A backlighted liquid crystal color display in accordance with claim 1 further characterized in that said first and second polarization orientations are parallel, and said second alignment layer is rubbed in regions of only one primary color in a direction that is parallel to said polarization orientations.

7. A backlighted liquid crystal color display in accordance with claims 6 further characterized in that said primary color regions on said second alignment layer, other than said regions of said one primary color, are rubbed in directions within an angular range of plus or minus 10° from said parallel polarization orientations.

8. A backlighted liquid crystal color display in accordance with claim 1 further characterized in that said first and second polarization orientations are perpendicular, and said second alignment layer is rubbed in regions of only one primary color in a direction that is parallel to second polarization orientation.

9. A backlighted liquid crystal color display in accordance with claim 8 further characterized in that said primary color regions on second alignment layer, other than said regions of said one primary color, are rubbed in directions within an angular range of plus or minus 10° from said second polarization orientation.

10. A backlighted liquid crystal color display in accordance with claim 1 further characterized in that said cell gaps are equal for all of said color filter cells.

11. A backlighted liquid crystal color display in accordance with claim 1 further characterized in that said cell gaps are not equal for all of said color filter cells.

12. A backlighted liquid crystal color display including a first polarizer having a first polarization orientation and a second polarizer having a second polarization orientation, a multiplicity of optical filter sets, each set including a plurality of primary color filters, first and second alignment layers respectively positioned adjacent said first and second polarizers, each said alignment layer having primary color regions respectively aligned with said primary color filters, spacing between said first and second alignment layers forming cell gaps in all color regions, and liquid crystal material disposed between said first and second alignment layers characterized in that said first and second alignment layers are rubbed in said primary color regions in directions that provide polarization twist angles between said first and second polarizers in said primary color regions in a manner that provides a polarization twist angle for at least one primary color that differs from that of all other primary color polarization twist angles further characterized in that said first and second polarization orientations are parallel, said first alignment layer is rubbed in regions of only one primary color in a direction parallel to said first polarization and primary color regions other than said regions of said one primary color are rubbed in directions within an angular range of plus and minus 5° of said first polarization orientation, and said second alignment layer is rubbed in regions of said only one primary color in a direction that is parallel to a perpendicular to said second polarization orientation and primary color regions other than said regions of said one primary color, are rubbed in directions within an angular range of plus or minus 5° from said perpendicular to said second polarization orientation.

13. A backlighted liquid crystal color display including a first polarizer having a first polarization orientation and a second polarizer having a second polarization orientation, a multiplicity of optical filter sets, each set including a plurality of primary color filters, first and second alignment layers respectively positioned adjacent said first and second polarizers, each said alignment layer having primary color regions respectively aligned with said primary color filters, spacing between said first and second alignment layers forming cell gaps in all color regions, and liquid crystal material disposed between said first and second alignment layers characterized in that said first and second alignment layers are rubbed in said primary color regions in directions that provide polarization twist angles between said first and second polarizers in said primary color regions in a manner that provides a polarization twist angle for at least one primary color that differs from that of all other primary color polarization twist angles further characterized in that said first and second polarization orientations are perpendicular, said first alignment layer is rubbed in regions of only one primary color in a direction that is parallel to a perpendicular to said first polarization and primary color regions other than said regions of said one primary color are rubbed in directions within an angular range of plus and minus 5° of said perpendicular to said first polarization, and said second alignment layer is rubbed in regions of said only one primary color in a direction that is perpendicular to said second polarization orientation and primary color regions other than said regions of said one primary color, are rubbed in directions within an angular range of plus or minus 5° from said perpendicular to said second polarization orientation.

14. A backlighted liquid crystal color display including a first polarizer having a first polarization orientation and a second polarizer having a second polarization orientation, a plurality of color filter cells, each color filter cell having liquid crystal material disposed between a first polarization alignment layer adjacent to said first polarizer, said first polarization alignment layer having been rubbed in a first rubbing direction wherein said first polarization alignment layer is rubbed in a direction substantially parallel to said first polarization orientation in a first primary color region and in directions within an angular range of plus or minus 10° from said first polarization orientation in other primary color regions, and a second polarization alignment layer adjacent said second polarizer, said second polarization alignment layer having been rubbed in a second rubbing direction, said first and second rubbing directions determining polarization twist angles between said first and second polarization alignment layers, spacing between said first and second alignment layers forming a cell gap, wherein said first alignment layer has been rubbed in such manner that molecules of said liquid crystals have molecular tilts relative to said first alignment layer, said molecular tilts being different in each color filter cell.

15. A backlighted liquid crystal color display in accordance with claim 14 further characterized in that said polarization twist angles are equal fore all said color filter cells.

16. A backlighted liquid crystal color display in accordance with claim 14 further characterized in that said polarization twist angles are not equal for all said color filter cells.

17. A backlighted liquid crystal color display in accordance with claim 14 further characterized in that all said cell gaps are equal.

18. A backlighted liquid crystal color display in accordance with claim 14 further characterized in that all said cell gaps are not equal.

19. A backlighted liquid crystal color display in accordance with claim 14 further characterized in that all said cell gaps are equal and all said twist angles are not equal.

20. A backlighted liquid crystal color display in accordance with claim 14 further characterized in that all said cell gaps are not equal and all said twist angles are not equal.

21. A method of providing a backlighted liquid crystal color display of the type that includes, a first polarizer having a first polarization orientation and a second polarizer having a second polarization orientation, a multiplicity of optical filter sets, each set including a plurality of primary color filters, first and second alignment layers respectively positioned adjacent said first and second polarizers, each said alignment layer having primary color regions respectively aligned with said primary color filters, spacing between said first and second alignment layers forming cell gaps in all color regions, and liquid crystal material disposed between said first and second alignment layers comprising the steps of rubbing said first and second alignment layers in said primary color regions in directions that provide polarization twist angles between said first and second polarizers in said primary color regions in a manner that provides a polarization twist angle for at least one primary color that differs from that of all other primary color polarization twist angles, said first alignment layer is rubbed in a direction substantially parallel to said first polarization orientation in a first primary color region and in directions within an angular range of plus or minus 10° from said first polarization orientation in other primary color regions.

22. A method accordance with claim 21 further including the step of rubbing said primary color regions on second alignment layer in directions within an angular range of plus or minus 10° from said second polarization orientation.

23. A method in accordance with claim 21 further including the steps of providing said first and second polarizers with parallel polarization orientations, rubbing said second alignment layer in regions of only one primary color in a direction that is perpendicular to said parallel polarization orientations, and rubbing said primary color regions on said second alignment layer, other than said regions of said one primary color, in directions within an angular range of plus or minus 10° from said parallel polarization orientations.

24. A method in accordance with claim 21 further including the steps of providing said first and second polarizers with parallel polarization orientations, rubbing said second alignment layer in regions of only one primary color in a direction that is parallel to said polarization orientations, and rubbing said primary color regions on said second alignment layer, other than said regions of said one primary color, in directions within an angular range of plus or minus 10° from said parallel polarization orientations.

25. A method in accordance with claim 21 further including the step of providing said first polarization orientation perpendicular to said second polarization orientation, rubbing said second alignment layer in regions of only one primary color in a direction that is parallel to said second polarization orientation and rubbing said primary color regions on said second alignment layer, other than said regions of said one primary color, in directions within an angular range of plus or minus 10° from said second polarization orientation.

26. A method of providing a backlighted liquid crystal color display of the type including a first polarizer having a first polarization orientation and a second polarizer having a second polarization orientation, a plurality of color filter cells, each color filter cell having liquid crystal material disposed between a first polarization alignment layer adjacent to said first polarizer and a second polarization alignment layer adjacent to said second polarizer, comprising the steps of rubbing said first polarization alignment layer in a first rubbing direction wherein said first polarization alignment layer is rubbed in a direction substantially parallel to said first polarization orientation in a first primary color region and in directions within an angular range of plus or minus 10° from said first polarization orientation in other primary color regions, rubbing said second polarization alignment layer in a second rubbing direction, said first and second rubbing directions determining polarization twist angles between said first and second polarization alignment layers, and spacing said first and second alignment layers to form a predetermined cell gap, rubbing of said first alignment layer performed in such manner that molecules of said liquid crystals have molecular tilts relative to said first alignment layer, said molecular tilts being different in each color filter cell.

27. A method in accordance with claim 26 wherein said rubbings on said first and second alignment are performed in a manner that provides said polarization twist angles to be equal for all said color filter cells.

* * * * *